(12) United States Patent
McBroom et al.

(10) Patent No.: US 9,823,638 B2
(45) Date of Patent: Nov. 21, 2017

(54) VARIABLE RESISTANCE ELECTRONIC DEVICE BRAKE CLUTCH

(71) Applicant: Apple Inc., Cupertino, CA (US)

(72) Inventors: Michael D. McBroom, Leander, TX (US); Daniel L. McBroom, Leander, TX (US); Steven C. Michalske, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/826,173

(22) Filed: Aug. 13, 2015

(65) Prior Publication Data

US 2017/0044810 A1 Feb. 16, 2017

(51) Int. Cl.
*E05D 11/08* (2006.01)
*E05C 17/64* (2006.01)
(Continued)

(52) U.S. Cl.
CPC ............ *G05B 15/02* (2013.01); *E05D 11/081* (2013.01); *F16D 55/02* (2013.01);
(Continued)

(58) Field of Classification Search
CPC ........... Y10T 16/54038; Y10T 16/5403; Y10T 16/536; Y10T 16/53605; Y10T 16/53607; Y10T 16/536075; Y10T 16/53608; Y10T 16/5362; Y10T 16/527; Y10T 16/5275; Y10T 16/528; Y10T 16/557; Y10T 16/54025; E05D 11/08; E05D 11/082; E05D 11/081; E05D 11/087; E05D 11/084; E05D 11/105; E05D 2011/1035; E05D 2011/088; E05D 5/10; E05D 7/10; E05D 7/1005; E05D 10/1044; E05D 15/502; E05D 15/505; E05D 15/507; E05Y 7/10; E05Y 7/1005; E05Y 7/1044; E05Y 2400/606; E05Y 2900/606; G05F 1/1681; G05F 1/1616; G05B 15/02; F16D 55/02; F16D 2055/0075; H05K 5/0226
See application file for complete search history.

(56) References Cited

U.S. PATENT DOCUMENTS 1,956,040 A * 4/1934 Meyer ................... E05D 11/081
16/340
4,186,905 A * 2/1980 Brudy ................... B60R 1/0617
16/321

(Continued)

*Primary Examiner* — Chuck Mah
(74) *Attorney, Agent, or Firm* — Downey Brand LLP

(57) ABSTRACT

A variable resistance brake clutch facilitates a rotational coupling of electronic device components, and can include a rotatable shaft, a brake disposed proximate the rotatable shaft, and an actuator coupled to and configured to actuate the brake. The brake applies a braking force against a rotational motion of the shaft, and release of the brake results in low to no frictional resistance against the rotational motion. The braking force can be provided by default, and a capacitive touch sensor or other input component can allow a user to actuate the actuator manually to release the brake when desired. The release can be maintained as long as the sensor detects the touch event or other user input. A processor and solenoid can facilitate actuation by on a touch event, which sensor can be located at a back corner of a laptop upper component.

20 Claims, 6 Drawing Sheets

SECTION A-A

(51) Int. Cl.
  *G05B 15/02* (2006.01)
  *F16D 55/02* (2006.01)
  *F16D 55/00* (2006.01)

(52) U.S. Cl.
  CPC ... *E05D 2011/088* (2013.01); *E05Y 2900/606* (2013.01); *F16D 2055/0075* (2013.01)

(56) References Cited

U.S. PATENT DOCUMENTS

| | | | |
|---|---|---|---|
| 5,088,156 A | 2/1992 | Hosoi | |
| 5,333,356 A * | 8/1994 | Katagiri | G06F 1/1681 16/340 |
| 5,715,576 A * | 2/1998 | Liu | G06F 1/1616 16/303 |
| 6,101,676 A | 8/2000 | Wahl et al. | |
| 6,233,785 B1 * | 5/2001 | Tanahashi | G06F 1/1616 16/273 |
| 8,634,183 B2 * | 1/2014 | Wikander | G06F 1/1681 361/679.01 |
| 8,752,248 B2 * | 6/2014 | Nakasone | B60R 11/00 16/337 |
| 8,806,717 B2 * | 8/2014 | Scheck | E05D 11/02 16/274 |
| 9,035,742 B2 * | 5/2015 | Rihn | G06F 1/1616 248/917 |
| 9,213,414 B1 * | 12/2015 | Henty | G06F 3/02 |
| 2002/0112319 A1 * | 8/2002 | Kida | G06F 1/1616 16/342 |
| 2003/0140457 A1 * | 7/2003 | Kida | G06F 1/1616 16/342 |
| 2011/0286160 A1 | 11/2011 | Duan et al. | |
| 2014/0098474 A1 | 4/2014 | Bhowmik et al. | |
| 2014/0268555 A1 * | 9/2014 | Kurczewski | G06F 1/1681 361/679.55 |
| 2014/0339062 A1 * | 11/2014 | Glad | G06F 3/03547 200/343 |
| 2015/0000083 A1 * | 1/2015 | Gwin | G06F 1/1681 16/321 |
| 2015/0022442 A1 * | 1/2015 | Hwang | G06F 1/1681 345/156 |
| 2015/0138713 A1 * | 5/2015 | Onda | G06F 1/1679 361/679.27 |
| 2015/0192929 A1 * | 7/2015 | Rihn | G06F 1/1616 700/275 |
| 2016/0070310 A1 * | 3/2016 | Holung | G06F 1/1681 361/679.09 |
| 2016/0123059 A1 * | 5/2016 | Liu | E05D 11/082 361/679.55 |
| 2016/0266608 A1 * | 9/2016 | Matsuoka | B21D 53/40 |
| 2016/0274597 A1 * | 9/2016 | Na | E05D 11/08 |
| 2017/0010636 A1 * | 1/2017 | Shao | G06F 1/1618 |

* cited by examiner

SECTION A-A

VARIABLE RESISTANCE ELECTRONIC DEVICE BRAKE CLUTCH

FIELD

The described embodiments relate generally to electronic devices. More particularly, the described embodiments relate to clutches between hinged components in electronic devices.

BACKGROUND

Hinge assemblies are commonly used to allow electronic device components to move relative to one another. For example, a laptop computing device can include a base component that is rotationally coupled to an upper display component by way of a hinge assembly. It is often desirable to provide some biasing or resistive force when moving the upper component of a laptop between closed and open positions, or between two different open positions. Many types of conventional friction-based clutches can provide such a resistive force for a hinge assembly. Such friction-based clutches can also provide a braking force that holds the upper component in a fixed position with respect to the base component once a user sets the upper component at a desired fixed position.

Unfortunately, many conventional friction-based clutches provide a fixed level of resistance at all times over a full range of motion of the hinge assembly. Consequently, the level of resistance cannot be lowered for specific portions of the range of motion, particular directions, or different times or circumstances. For example, a user may need to hold the base component at the same time that he or she adjusts the position of the upper component in order to prevent any simultaneous lift or following motion of the base component. This can be inconvenient when the user merely wishes to adjust slightly the upper component position and may only want or have one hand to do this. Further, a fixed level of resistance can often be too much and a nuisance when a user wishes to open a laptop from a closed position.

While current hinge and clutch designs for electronic devices have worked well in the past, there is often room for improvement. Accordingly, there is a need for improved clutch designs for electronic devices that allow for varying levels of resistance.

SUMMARY

Representative embodiments set forth herein disclose various structures, methods, and features thereof for the disclosed variable resistance brake clutches configured for use in an electronic device. In particular, the disclosed embodiments set forth electronic devices and hinges therefor having clutches that provide a braking or resistive force at some times and no braking or resistive force at other times.

According to various embodiments, a touch activated clutch assembly is configured for coupling electronic device components. The touch activated clutch assembly can include at least: 1) a brake that applies a resistive force, 2) an actuator coupled to and configured to act upon the brake, and 3) a touch sensitive surface in communication with the actuator. The actuator acts upon the brake in response to a touch event detected at the touch sensitive surface.

In some embodiments, the touch activated clutch assembly is a variable resistance brake clutch that includes a rotatable shaft, with the brake disposed proximate the rotatable shaft, and the actuator configured to release the brake. The brake can apply a resistive force against a rotational motion of the shaft, and release of the brake results in low to no resistive force against the rotational motion. The braking force can be provided by default, and a capacitive touch or other touch sensor can allow a user to actuate the actuator manually to release the brake. The release can be maintained as long as the sensor detects the touch event. A processor and solenoid can facilitate actuation based on a sensor touch, which sensor can be located at a housing of the electronic device, such as at a back corner of a laptop upper component.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims. Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and methods for the disclosed variable resistance brake clutches configured for use in an electronic device. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of structures and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Electronic devices, such as laptop computers, often include components that are rotationally coupled by way of a hinge assembly having a friction-based clutch. Such clutches tend to deliver a fixed level of resistance or braking at all times, which can be useful in some instances, and unhelpful or annoying in other instances. There is thus a desire for improved clutch designs for electronic devices that allow for varying levels of resistance depending upon the particular circumstances.

The embodiments set forth herein thus provide various structures and methods for providing variable resistance brake clutches configured for use in an electronic device. According to some embodiments, a variable resistance brake clutch facilitates a rotational coupling of electronic device components. The variable resistance brake clutch can include at least a brake and an actuator. In detailed embodiments, a variable resistance brake clutch can include a rotatable shaft, a brake disposed proximate the rotatable shaft, and an actuator coupled to and configured to release the brake. The brake applies a braking or resistive force against a rotational motion of the shaft, and release of the brake results in a low to no braking or resistive force against the rotational motion. The braking force can be provided by default, and a capacitive touch sensor or other touch event sensor or input component can allow a user to actuate the actuator manually to release the brake when desired. The release can be maintained as long as the sensor detects the relevant touch event or other user input. A processor and solenoid can facilitate actuation based on a touch event at a sensor, which sensor can be located at a housing of the electronic device, such as at a back corner of a laptop upper component.

The foregoing approaches provide various structures and methods for the disclosed variable resistance brake clutches configured for use in an electronic device. A more detailed discussion of these structures, methods, and features thereof is set forth below and described in conjunction with FIGS. 1-6, which illustrate detailed diagrams of devices and components that can be used to implement these structures, methods, and features.

Figure 1:
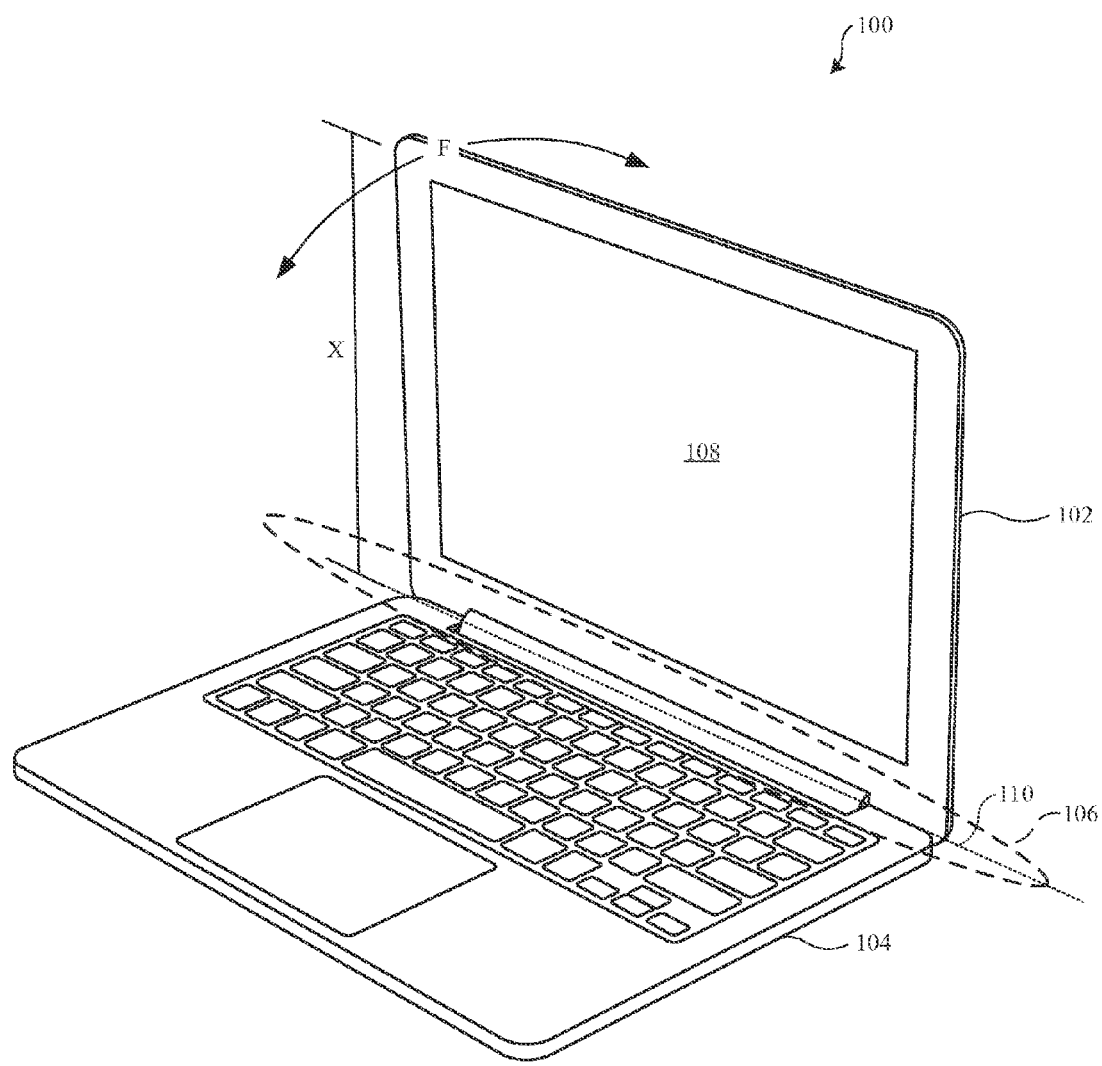
FIG. 1 illustrates in front perspective view an exemplary electronic device according to various embodiments of the present disclosure.

Turning first to FIG. 1, an exemplary electronic device according to various embodiments of the present disclosure is illustrated in front perspective view. Electronic device 100 can take the form of a laptop computer, which can include an upper component 102 and a base component 104. Upper component 102 can house a display 108, electronics for controlling display 108, and other electrical elements. Base component 104 can house a keypad, trackpad, processor, memory, integrated circuits, a battery, and other electrical elements suitable for operating computing device 100.

Upper component 102 can be pivotally or rotationally coupled to base component 104 by a hinge assembly (not shown) located within intersection 106 of upper component 102 and base component 104. The hinge assembly can define an axis of rotation 110 about which upper component 102 can be pivotally rotated relative to base component 104. The hinge assembly can include a friction-based clutch (not shown) that resists an application of force "F" on the upper component at a distance "X" from the axis of rotation 110 during relative rotation of upper component 102 with respect to base component 104. As noted above, conventional friction-based clutches tend to provide a constant resistance in response to force "F" applied in either of the depicted directions.

Figure 2:
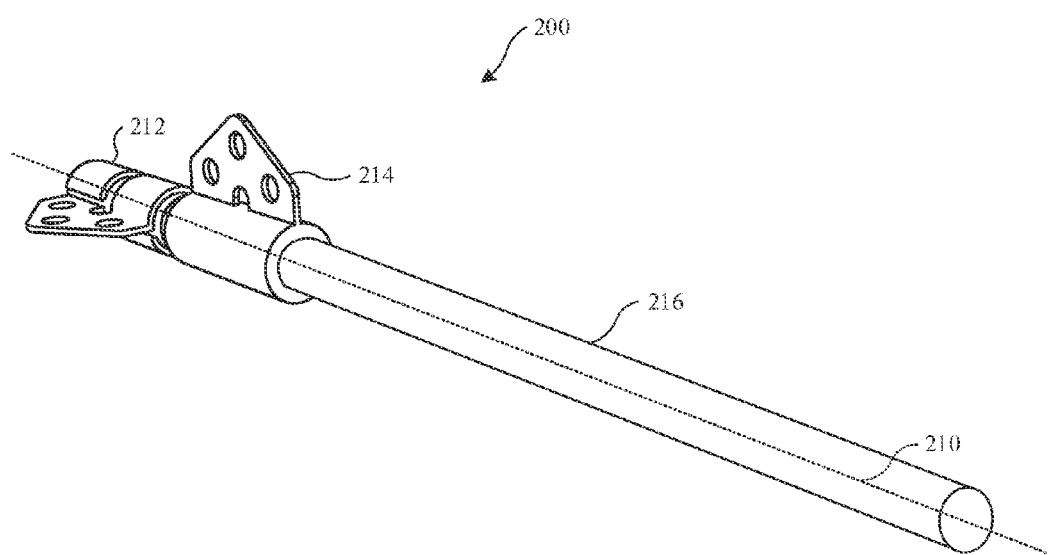
FIG. 2 illustrates in front perspective view an exemplary hinge portion for use in the exemplary electronic device of FIG. 1.

Continuing with FIG. 2, an exemplary hinge portion suitable for use in the exemplary electronic device of FIG. 1 is shown in front perspective view. Hinge portion 200 can include a first bracket 212 and a second bracket 214, each of which can operate to couple the hinge portion 200 to hinged components in an electronic device. For example, first bracket 212 can be coupled to upper component 102 and second bracket 214 can be coupled to base component 104, or vice-versa. Hinge portion can also include a rotatable shaft 216 having a longitudinal axis 210, about which one or both of the first bracket 212 and second bracket 214 can rotate. First bracket 212 and second bracket 214 can be located at or near one end of the shaft 216, as shown. Additional corresponding brackets (not shown) for each of the hinged components can be located at or near the other end of the shaft 216 (not shown), such as where shaft 216 can traverse most or all of the length of the electronic device. In other embodiments, shaft 216 can be shorter such that it does not extend past a midpoint of the electronic device. Hinge portion 200 can also include one or more clutch structures (not shown), such as to provide resistive or braking forces with respect to rotation about the shaft 206. In various embodiments, multiple hinge portions 200, each of which may include its own shaft 216, may be used to facilitate a specific hinge function for a given electronic device.

Figure 3A:
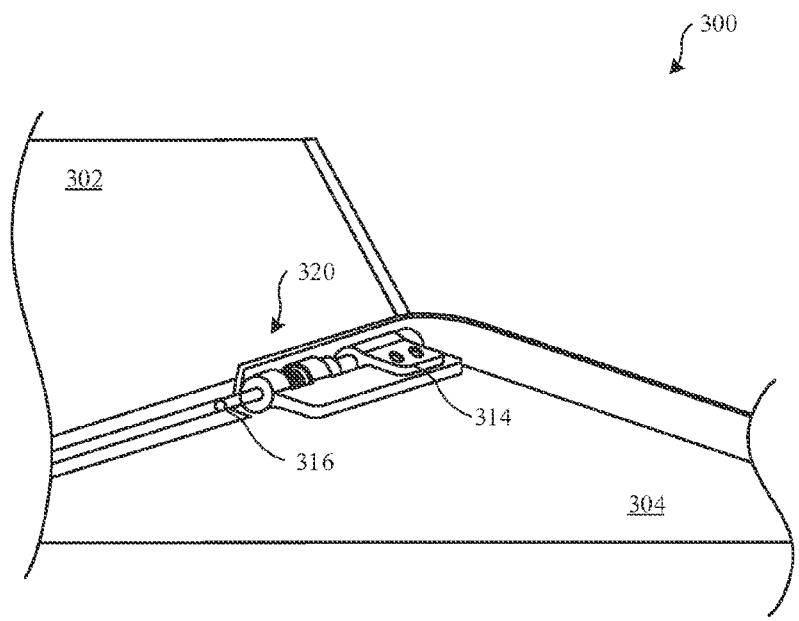
FIG. 3A illustrates in partially cut-away front perspective view an exemplary electronic device having a variable resistance brake clutch in an open configuration according to various embodiments of the present disclosure.

FIG. 3A illustrates in partially cut-away front perspective view an exemplary electronic device having a variable resistance brake clutch in an open configuration according to various embodiments of the present disclosure. Electronic device 300 can again take the form of a laptop computer, which can include an upper component 302 and a base component 304. A variable resistance brake clutch 320 can be located at a hinged region of electronic device 300. The variable resistance brake clutch 320 (or a hinge of which the clutch is a part) can include a number of items, such as a mounting bracket 314 and a shaft 316, which can be a rotatable shaft. As will be readily appreciated, shaft 316 can be adapted to rotate such that one or both of upper component 302 and base component 304 rotate with the shaft 316. In various embodiments, the upper component 302 can rotate with the shaft 316 while base component 304 does not rotate.

Figure 3B:
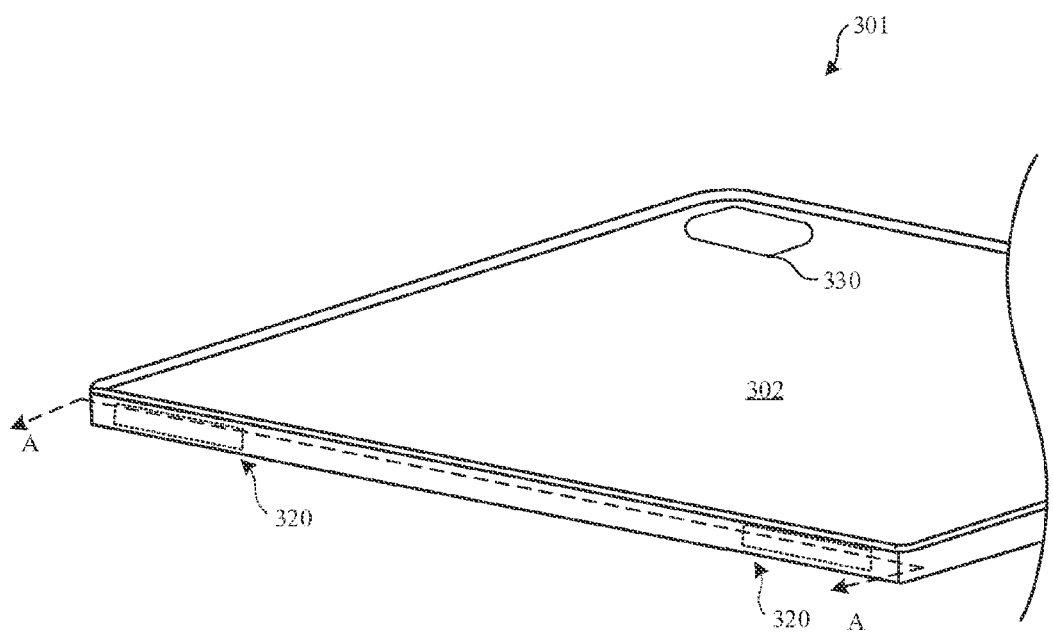
FIG. 3B illustrates in obverse perspective view the exemplary electronic device having a variable resistance brake clutch of FIG. 3A in a closed configuration according to various embodiments of the present disclosure.

FIG. 3B illustrates in obverse perspective view the exemplary electronic device having a variable resistance brake clutch of FIG. 3A in a closed configuration according to various embodiments of the present disclosure. Closed configuration 301 depicts the upper component 302 being shut with respect to the base component. As shown, two separate variable resistance brake clutches 320 can be disposed at or about the ends of a hinge region for the electronic device. The variable resistance brake clutches 320 are typically disposed within the hinge region behind an outer housing of the electronic device, and are thus depicted as dotted lines in the simple obverse perspective view of FIG. 3B. More details for a variable resistance brake clutch are provided in the close-up cross-sectional view along section A-A set forth in FIG. 4 below. In some embodiments, only one variable resistance brake clutch might be used, while in other embodiments more than two variable resistance brake clutches might be used, as may be desired. Furthermore, a single shaft 316 might extend through both or all variable resistance brake clutches 320, or alternatively separate shafts 316 might be used for each separate variable resistance brake clutch 320.

In addition, one or more sensors 330 may be disposed about the electronic device. Such one or more sensors 330 can be configured to detect a user input and operate one or more of the variable resistance brake clutch(es) in response to the user input. Such an operation can be by way of a signal sent to a controller or processor in the electronic device, which controller or processor can then send a command to an actuator within the variable resistance brake clutch. In various embodiments, the actuator can be configured to apply and/or release a brake within the variable resistance brake clutch 320, depending upon the clutch arrangement. In one particular example, sensor 330 can be a capacitive touch sensor that is configured to detect a touch of a user, such as a finger touch. Of course, other types of sensors or user input components can alternatively or also be used to allow touch events or other user input that actuates the variable resistance brake clutch(es) 320. Such other sensors and inputs can include, for example, inductive sensors, resistive sensors, pressure sensors, push buttons, motion sensors, hall effect sensors, strain gauge sensors, voice recognition devices, and the like, among other suitable sensors and inputs. In some arrangements, one or more sensors within the clutch itself can sense force, movement, or a change in either, which can indicate a desire to move the components. Such a detection can also serve as a suitable touch event or other user input that triggers actuation.

One or more sensor(s) 330 or other user input(s) can be located at a strategic location for purposes of actuating the associated variable resistance brake clutch(es) 320. For example, sensor 330 can be located at a back corner of an upper portion of a laptop computer. This location can be a typical location where a user might grasp or otherwise touch the electronic device 300 when the user wishes to adjust the upper portion of the laptop or otherwise rotationally pivot one device component with respect to another device component. A touch or grasp by the user on sensor 330 at this location can thus facilitate an actuation of the variable resistance brake clutch(es) 320, whereby a brake force or other resistive force of the clutch is released or let go. This then allows the hinge coupling the upper and base portions to be freely rotatable with little to no resistive force. In various embodiments, this actuation or release of the brake force can be maintained so long as a user touch at sensor 330 is detected, or so long as a similar alternative sensor or user input remains.

Other sensors and/or sensor locations may alternatively or also be used in association with the disclosed variable resistance brake clutches, such as for use in a laptop computer or other electronic device. For example, one or more accelerometers and/or gyroscopes may be used to monitor the relative position of upper component 302, as well the overall device orientation to gravity. Other possible sensors can include strain gauges, position encoders, rotary variable differential transformers, or other rotational position sensors, one or more of which can be used to determine the relative position of upper component 302 with respect to base component 304. The location of such sensors can be within the hinge region or even within the clutch itself, for example.

Figure 4:
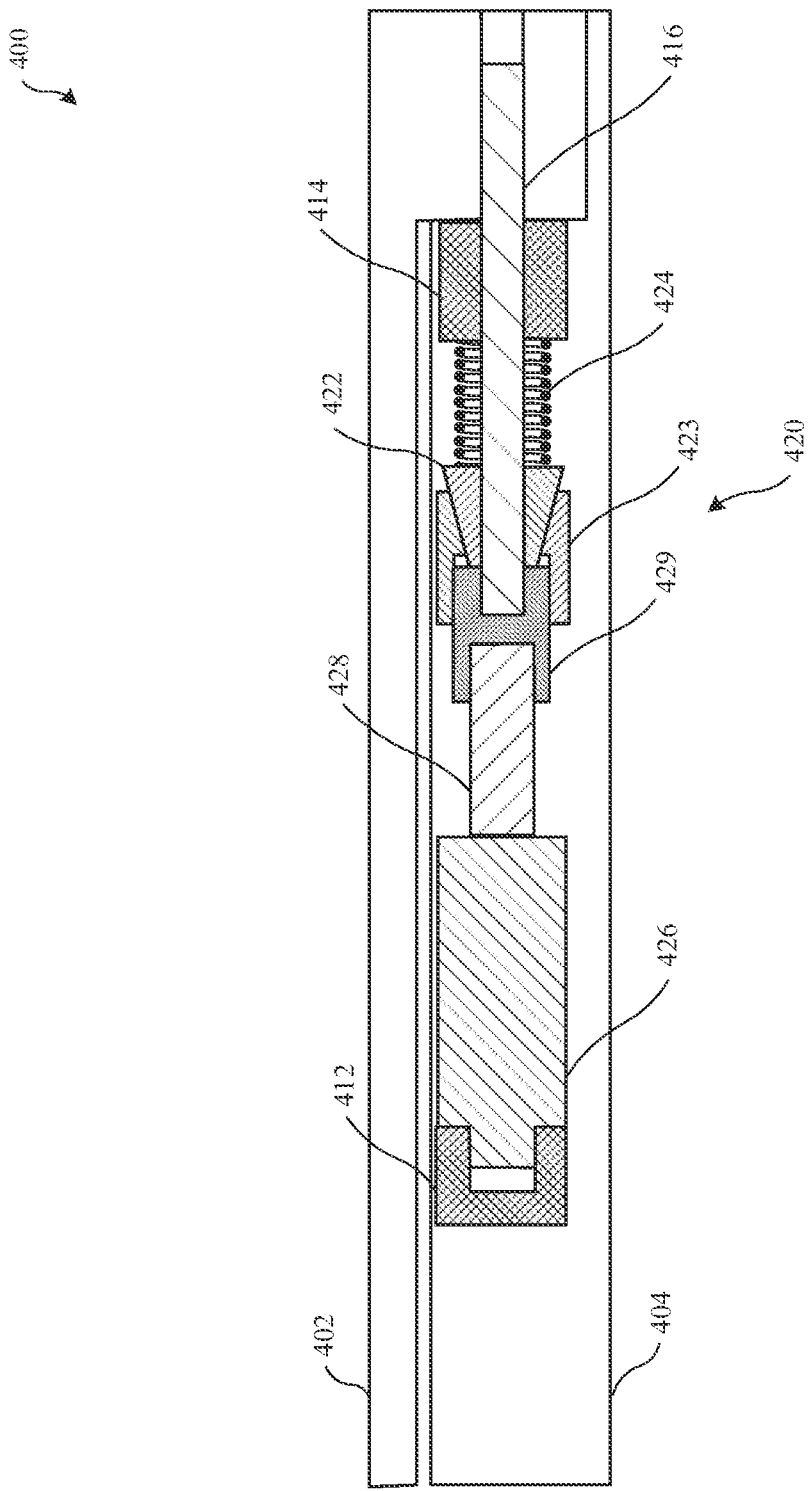
FIG. 4 illustrates in side cross-sectional view an exemplary variable resistance brake clutch for use in the exemplary electronic device of FIGS. 3A-3B along section A-A of FIG. 3B according to various embodiments of the present disclosure.

Turning now to FIG. 4, an exemplary variable resistance brake clutch for use in the exemplary electronic device of FIGS. 3A-3B is illustrated in side cross-sectional view along section A-A of FIG. 3B. As shown, arrangement 400 can include a first electronic device component 402 (e.g., an upper portion for a laptop), a second electronic device component 404 (e.g., a base component for a laptop), and a variable resistance brake clutch 420. The variable resistance brake clutch 420 can be an assembly of various components, which can include, for example, one or more mounting brackets 412, 414, a shaft 416, a brake 422, a biasing component 424, an actuator 426, an actuator shaft 428, and a clutch coupling 429, among other possible components.

In various specific embodiments, the mounting brackets 412, 414 can mount or otherwise couple the variable resistance brake clutch 420 to the first and second electronic device components 402, 404. Also, the shaft 416 can be rotatable about an axis, such as its own longitudinal axis and/or an axis of rotation for an overall hinge. In various specific embodiments, the brake 422 can be a conical brake drum fastened to and disposed around a portion of the shaft 416 and configured to rotate therewith to impart a braking or resistive force to a non-rotating brake ring 423, which may have one or more brake pads or linings (not shown). Biasing component 424 can be a spring that pushes against the brake 422 to engage the brake 422 against the brake ring 423. The actuator 426 can be a solenoid or piezo type actuator having an actuator shaft 428 that can be coupled to the brake 422 and biasing component 424 arrangement by way of a clutch coupling 429 or other suitable component. In various embodiments, actuator 426 can be an electric motor, or any other item that can suitably serve as an actuator for the purposes of the disclosed variable resistance brake clutch. Of course, other suitable specific items can be used for each of the components within variable resistance brake clutch 420, as may be desired and appropriate.

When the solenoid or other actuator 426 is actuated, the biasing force of spring or other biasing component 424 can be overcome, such that conical brake drum or other brake 422 becomes released or disengaged with brake ring 423, resulting in little to no braking or resistive force between the brake 422 and brake ring 423 with respect to a rotational motion of the shaft 416 and brake 422. Again, actuator 426 can be in communication with and controlled or actuated by way of a controller or processor located at the electronic device. Such a controller or processor can also be in communication with one or more sensors or user input components, such that the actuation and non-actuation of actuator 426 can be manually controlled by a user when and as desired. Sensors in communication with the controller or processor can include sensor 330 above, and/or one or more of the various touch sensitive, position, and/or device orientation sensors noted above.

In general then, the disclosed variable resistance brake clutches can facilitate a freely rotating hinge or assembly when the brake is released or not applied, such as by the manual touch or input of a user. The disclosed variable resistance brake clutches can also provide a high or significant level of frictional or resistive force when the brake is engaged, which can be a default condition. As noted above, the brake can be released when a user touch or other input is detected, and this brake release and freely rotating state can be maintained so long as the user touch or input remains in effect. In various embodiments, the solenoid or other actuator deactivates and the brake is returned to its activated position when the user touch or input is removed or broken.

In various alternative embodiments, the processor or controller can facilitate an actuation pattern or time period that does not exactly match the presence of a user touch or input. For example, the processor or controller can be configured to command the solenoid or other actuator to actuate for a minimum set time period whenever a user touch or other input is detected. Such a minimum set time period can be on the order of one to ten seconds, for example. In this manner, a user can actuate the clutch and then be able to freely move the device components with respect to each other for a short period of time without needing to maintain a touch or force on the input sensor. Other patterns of actuation and deactivation are also possible.

In various embodiments, the disclosed variable resistance brake clutches can be partially activated, such that the typical full amount of braking force is reduced but not fully released. Such a partial braking force can be applied in response to various sensor inputs, such as where position and/or gravity orientation sensors provide input that indicates a modulated force may be appropriate. In such instances, the controller or processor can be configured to use the additional sensor inputs to modulate the braking force applied by the variable resistance brake clutch. For example, where the base component 304 of a laptop device is not at a flat position, detection of this condition by one or more additional sensors can provide an input to the controller or processor that results in a partial activation of the brake clutch resulting in a partial reduction in braking force to the shaft, rather than a full release or reduction of the braking force.

Figure 5:
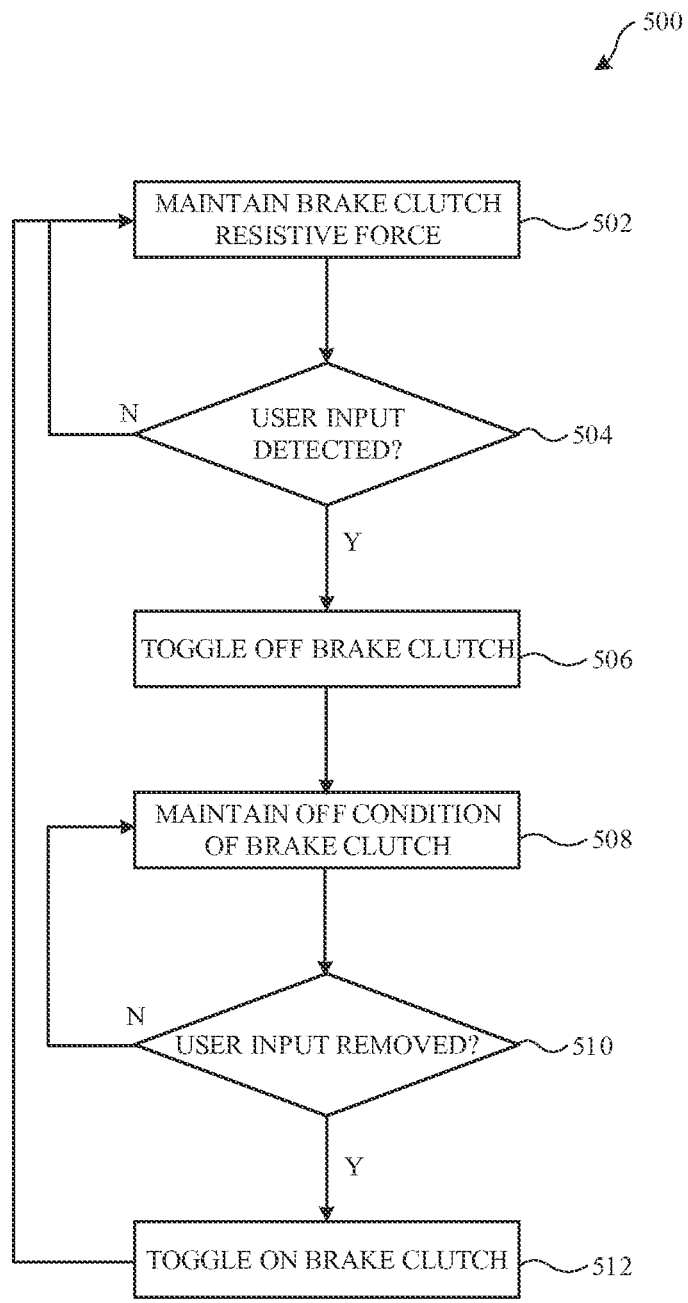
FIG. 5 illustrates a flowchart of an exemplary method performed by a processor for operating a variable resistance brake clutch for an electronic device according to various embodiments of the present disclosure.

FIG. 5 illustrates a flowchart of an exemplary method performed by a processor for operating a variable resistance brake clutch for an electronic device according to various embodiments of the present disclosure. Method 500 can be carried out by a processor or other controller that may also be located on the electronic device where the variable resistance brake clutch is located, for example. Method 500 can start at a process step 502, where a brake clutch resistive force can be maintained. Such a maintained resistive force by the brake clutch can be a default condition of the brake clutch.

At a subsequent decision step 504, an inquiry can be made as to whether a user input regarding the brake clutch has been detected. As set forth above, the user input can be a detected capacitive touch at a particular location, such as at an upper back corner of a lid or upper portion of a laptop computer, for example. Other user inputs may also apply for the brake clutch, as will be readily appreciated. If a user input is not detected, then the method reverts back to process step 502, where the resistive force is maintained. When a user input is detected at decision step 504, however, then the method moves to process step 506.

At process step 506, the brake clutch is toggled to off. This can be accomplished, for example, by actuating the brake to a disengaged position. The actuator can be a solenoid, piezo, or other suitable actuating component, which can deactivate a biasing spring that then moves a conical brake to a disengaged or holding position, for example. At following process step 508, an off condition of the brake clutch is maintained. While the brake clutch is in the off position, little to no resistive force is provided against a rotational motion of hinged components. Again, such components can be the upper and base portions of a laptop computer, for example, among other possible components. At a subsequent decision step 510, an inquiry can be made as to whether the user input has been removed. If not, then the method reverts back to process step 508, where the brake clutch remains off. If it is detected that the user input has been removed, however, then the method continues to process step 512. Such a removal of user input can be, for example, the user removing his or her finger or hand from the capacitive touch location, which can be at an upper back corner of the upper portion of a laptop computer.

At process step 512, the brake clutch is toggled to on. This can be accomplished, for example, by de-actuating the brake from a disengaged or holding position. Such a de-actuation can reactivate a biasing spring that then returns a conical brake to an engaged position, for example. Again, putting the brake back into an engaged position can result in a resistive force against a rotational motion of hinged components. With the brake clutch toggled to on, the method can then revert to process step 502, where the brake clutch resistive force is maintained. The method can then repeat at the next instance of a user input that actuates the brake clutch.

For the foregoing flowchart, it will be readily appreciated that not every step provided is always necessary, and that further steps not set forth herein may also be included. For example, added steps that involve maintaining the off condition of the brake clutch for a set time period may be added. Also, steps that provide more detail with respect to sensing and transmitting the user input or even multiple user inputs may also be added. Additional steps that involve the actuation and use of a second brake may also be added. Furthermore, the exact order of steps may be altered as desired, and some steps may be performed simultaneously.

Figure 6:
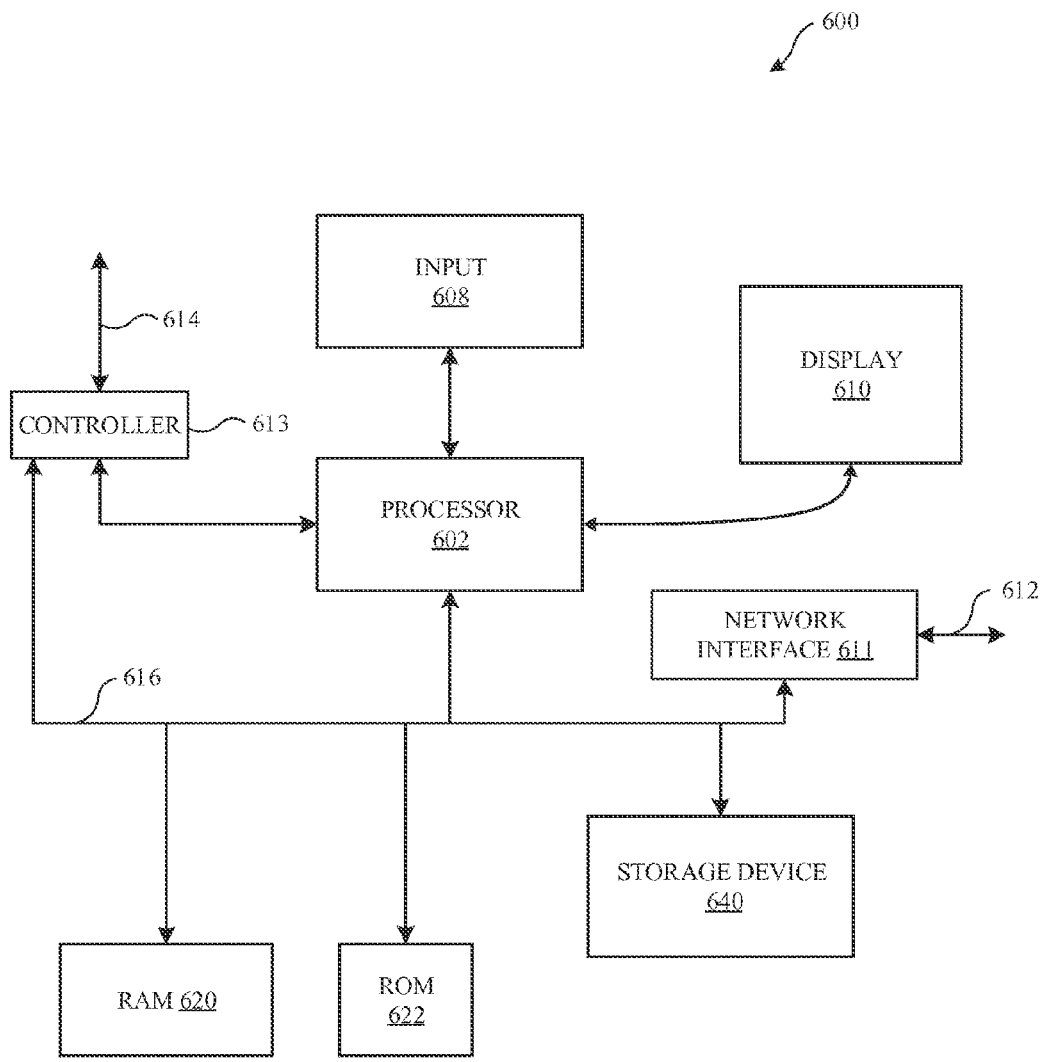
FIG. 6 illustrates in block diagram format an exemplary computing device that can be used to implement the various

FIG. 6 illustrates in block diagram format an exemplary computing device 600 that can be used to implement the various components and techniques described herein, according to some embodiments. In particular, the detailed view illustrates various components that can be included in the electronic device 100 illustrated in FIG. 1. Such components can include a variable resistance brake clutch, such as that which is shown in FIG. 4, as well as a processor that controls the clutch, such as by way of the method shown in FIG. 5. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a capacitive touch surface as set forth above, as well as a button, keypad, dial, touch screen, audio input interface, visual/image capture input interface, input in the form of other sensor data, etc. Still further, the computing device 600 can include a display 610 (screen display) that can be controlled by the processor 602 to display information to the user (for example, a movie or other AV or media content). A data bus 616 can facilitate data transfer between at least a storage device 640, the processor 602, and a controller 613. The controller 613 can be used to interface with and control different equipment through and equipment control bus 614. Such equipment can include, for example, a variable resistance brake clutch, such as that which is disclosed herein. The computing device 600 can also include a network/bus interface 611 that couples to a data link 612. In the case of a wireless connection, the network/bus interface 611 can include a wireless transceiver.

The computing device 600 can also include a storage device 640, which can comprise a single disk or a plurality of disks (e.g., hard drives), and includes a storage management module that manages one or more partitions within the storage device 640. In some embodiments, storage device 640 can include flash memory, semiconductor (solid state) memory or the like. The computing device 600 can also include a Random Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic device comprising:
   electronic device components;
   a coupling element; and
   a touch activated clutch assembly rotationally coupled to the electronic device components by the coupling element, the touch activated clutch assembly including:
     a brake including a conical brake drum disposed around a portion of a rotatable shaft and configured to rotate with the rotatable shaft, the brake drum positioned proximate to a non-rotating brake ring such that, when the brake drum engaged with the brake ring, the brake drum applies a resistive force against the brake ring that inhibits motion within the touch activated clutch assembly;
     a biasing component that applies a biasing force against the brake, engaging the brake drum with the brake ring;
     an actuator coupled to the brake and configured to act upon the brake; and
     a touch sensitive surface located at one of the electronic device components and in communication with the actuator,
   wherein the actuator acts upon the brake and against the biasing force of the biasing component in response to a communication regarding a touch event detected at the touch sensitive surface, thereby reducing the resistive force applied by the brake drum against the brake ring.

2. The electronic device of claim 1, wherein the resistive force inhibits a rotational motion of the rotatable shaft.

3. The electronic device of claim 1, wherein the actuator is configured to be in communication with a processor to receive an actuation command therefrom.

4. The electronic device of claim 1, wherein the actuator is configured to act upon the brake as long as the touch event continues.

5. The electronic device of claim 1, wherein the actuator is configured to act upon the brake for a set time period after the touch event occurs.

6. The electronic device of claim 1, wherein the brake is configured to apply the resistive force as a default condition of the touch activated clutch assembly.

7. The electronic device of claim 6, wherein the actuator is configured to fully disengage the brake drum from the non-rotating brake ring.

8. The electronic device of claim 1, wherein the actuator includes a solenoid or piezo component.

9. The electronic device of claim 1, wherein the touch sensitive surface comprises a capacitive surface.

10. The electronic device of claim 1, wherein the electronic components include a first device component that is an upper component of a laptop computer and a second device component that is a base component of the laptop computer.

11. The electronic device of claim 1, wherein the biasing component includes a biasing spring that applies the biasing force against the brake.

12. The electronic device of claim 1, further comprising:
    a processor in communication with the actuator, the processor being configured to send an actuation command to the actuator.

13. The electronic device of claim 12, further comprising:
    a sensor in communication with the processor, the sensor being configured to detect the touch event and send a signal to the processor regarding the touch event.

14. The electronic device of claim 13, wherein the sensor comprises a capacitive touch sensor located on an outer housing of the electronic device.

15. A method for operating an electronic device having a touch sensitive variable resistance brake clutch, the method comprising:
    allowing a resistive force that inhibits motion within the touch sensitive variable resistance brake clutch to be maintained against a rotational motion of a clutch shaft by engaging, with a biasing component, a conical brake drum with a non-rotating brake ring, wherein the conical brake drum is disposed around a portion of the clutch shaft and configured to rotate with the clutch shaft, and wherein the clutch shaft facilitates a rotational coupling of a first electronic device component and a second electronic device component;
    detecting a touch event by a sensor at a location on the electronic device that is separate from the location of the variable resistance brake clutch; and
    releasing the resistive force in response to detection of the touch event by actuating an actuator coupled to the conical brake drum,
    wherein, when actuated, the actuator acts against a biasing force applied to the conical brake drum by the biasing component and disengages the conical brake drum from the non-rotating brake ring, reducing the resistive force that inhibits motion within the touch sensitive variable resistance brake clutch.

16. The method of claim 15, further comprising:
maintaining the release of the resistive force while the touch event continues;
detecting an end of the touch event; and
allowing the resistive force to be reapplied in response to detection of the end of the touch event.

17. The method of claim 15, wherein the method is performed by a processor at the electronic device, and further comprising:
sending a command from the processor to the actuator at the touch sensitive variable resistance brake clutch in response to detecting the touch event.

18. An electronic device comprising:
a first electronic component;
a second electronic component;
a touch activated clutch assembly coupled to the first and second electronic components, and configured to facilitate rotation of the first electronic component with respect to the second electronic component, the clutch assembly comprising:
a rotatable shaft;
a brake drum disposed on the rotatable shaft and configured to rotate with the rotatable shaft;
a non-rotating brake ring shaped to receive the brake drum, wherein receiving the brake drum applies a resistive force that inhibits rotation of the first electronic component with respect to the second electronic component; and
an actuator coupled to the brake drum; and
a touch sensitive surface located at one of the electronic device components and in communication with the touch activated clutch assembly,
wherein, in response to detecting a touch event at the touch sensitive surface, the actuator releases the brake drum from the non-rotating brake ring and reduces the resistive force.

19. The electronic device of claim 18, wherein the brake drum comprises a conical shaped brake drum and the non-rotating brake ring is shaped to receive the conical shaped brake drum.

20. The electronic device of claim 18, wherein the clutch assembly further comprises a biasing spring that biases the brake drum into the non-rotating brake ring.

\* \* \* \* \*